US011113705B2

(12) United States Patent
Sewak

(10) Patent No.: US 11,113,705 B2
(45) Date of Patent: Sep. 7, 2021

(54) BUSINESS FORECASTING USING PREDICTIVE METADATA

(71) Applicant: International Business Machines Corporation, Armonk, NY (US)

(72) Inventor: Mohit Sewak, Lucknow (IN)

(73) Assignee: International Business Machines Corporation, Armonk, NY (US)

(*) Notice: Subject to any disclaimer, the term of this patent is extended or adjusted under 35 U.S.C. 154(b) by 150 days.

(21) Appl. No.: 16/238,576

(22) Filed: Jan. 3, 2019

(65) Prior Publication Data

US 2019/0139061 A1 May 9, 2019

Related U.S. Application Data

(63) Continuation of application No. 14/287,298, filed on May 27, 2014, now abandoned.

(51) Int. Cl.
G06Q 10/00 (2012.01)
G06Q 30/02 (2012.01)
G06Q 10/06 (2012.01)

(52) U.S. Cl.
CPC ....... *G06Q 30/0202* (2013.01); *G06Q 10/063* (2013.01)

(58) Field of Classification Search
None
See application file for complete search history.

(56) References Cited

U.S. PATENT DOCUMENTS

| 7,945,472 | B2 | 5/2011 | Pappas | |
| 8,078,485 | B1* | 12/2011 | Kraehmueller | G06Q 10/063 705/7.11 |
| 8,108,235 | B2 | 1/2012 | Chowdhary | |
| 8,311,863 | B1* | 11/2012 | Kemp | G06Q 10/0639 705/7.11 |
| 8,364,519 | B1 | 1/2013 | Basu | |
| 10,373,322 | B1* | 8/2019 | Buibas | G06K 9/00201 |
| 2002/0035565 | A1* | 3/2002 | Shah | G06F 16/2428 |

(Continued)

OTHER PUBLICATIONS

Tuarob, Suppawong, Fad or Here to Stay, Aug. 6, 2013, DATA Laboratory, file:///C:/Users/jwaesco/Documents/e-Red%20Folder/16238576ZIDETC2013_tuarob_presentation.v3.pdf, p. 1-25. (Year: 2013).*

(Continued)

*Primary Examiner* — Joseph M Waesco
(74) *Attorney, Agent, or Firm* — William E. Schiesser

(57) ABSTRACT

A business forecasting tool utilizing metadata is provided. A processor receives one or more sets of business metrics. A processor receives a first metadata descriptor for a first set of business metrics of the one or more sets of business metrics. A processor receives a second metadata descriptor for a second set of business metrics of the one or more sets of business metrics. A processor prepares the first set of business metrics for prediction of a third set of business metrics based on, at least in part, the first metadata descriptor, where the first set and third set each correspond to a different time period. A processor generates a fourth set of business metrics based on, at least in part, the second metadata descriptor, where the second set and fourth set each correspond to a different time period.

17 Claims, 5 Drawing Sheets

(56) References Cited

U.S. PATENT DOCUMENTS

| | | | | |
|---|---|---|---|---|
| 2004/0093296 | A1* | 5/2004 | Phelan | G06Q 30/02 705/36 R |
| 2006/0129564 | A1* | 6/2006 | Shah | G06F 21/6218 |
| 2007/0143174 | A1* | 6/2007 | Tien | G06Q 10/0639 705/7.39 |
| 2007/0198323 | A1* | 8/2007 | Bourne | G06Q 10/06395 705/7.41 |
| 2007/0244738 | A1* | 10/2007 | Chowdhary | G06Q 10/0637 705/7.31 |
| 2008/0189632 | A1* | 8/2008 | Tien | G06Q 30/02 715/764 |
| 2008/0270363 | A1* | 10/2008 | Hunt | G06F 16/2462 |
| 2008/0294996 | A1* | 11/2008 | Hunt | G06Q 30/02 715/739 |
| 2008/0301539 | A1* | 12/2008 | Middelfart | G06Q 10/06 715/201 |
| 2010/0114899 | A1* | 5/2010 | Guha | G06F 16/9535 707/741 |
| 2010/0257025 | A1* | 10/2010 | Brocklebank | G06Q 10/0639 705/7.31 |
| 2011/0071886 | A1* | 3/2011 | Schnur | G06Q 10/103 705/7.38 |
| 2011/0179066 | A1* | 7/2011 | Cardno | G06F 16/00 707/769 |
| 2011/0179370 | A1* | 7/2011 | Cardno | G06K 9/6267 715/771 |
| 2011/0261049 | A1* | 10/2011 | Cardno | G06Q 10/10 345/419 |
| 2011/0294566 | A1* | 12/2011 | Cardno | G07F 17/32 463/25 |
| 2012/0191636 | A1 | 7/2012 | Negi | |
| 2013/0060603 | A1 | 3/2013 | Wagner | |
| 2013/0304530 | A1* | 11/2013 | Chodavarapu | G06Q 10/067 705/7.11 |
| 2014/0114909 | A1* | 4/2014 | Schuster | G06F 11/3006 707/602 |
| 2015/0186819 | A1* | 7/2015 | Patel | G06Q 10/06375 705/7.37 |
| 2015/0347933 | A1 | 12/2015 | Sewak | |
| 2015/0348066 | A1 | 12/2015 | Sewak | |

OTHER PUBLICATIONS

IBM Appendix P., "List of IBM Patents or Patent Applications Treated As Related", dated Jan. 2, 2019, 2 pages.

Lalor, K., "ERP Dashboards and Revenue Recognition: Using Visual Information to Maximize Efficiency", Bi101 Blog, posted on Nov. 25, 2013, Copyright 2013 Business Intelligence 101, 6 pages, <http:fblog.bi101.comnetsuiteerp-dashboards-revenue-recognition>.

Reddy et al. "Business Intelligence Impact and Future Trends" The International Journal of Computer Science & Applications (TIJCSA) Research Paper, vol. 2 No. 5, Jul. 2013, Copyright 2013 TIJCSA, pp. 31-37<http:www.journalofcomputerscience.com>.

* cited by examiner

BUSINESS FORECASTING USING PREDICTIVE METADATA

BACKGROUND OF THE INVENTION

The present invention relates generally to the field of business forecasting, and more particularly to generating predictive metadata.

Business forecasting is a technique used by companies to determine predictions in the operation and profitability of a business or department within the business. The predictions help establish trends which influence decisions about budgeting, resource allocation, and planning. Business forecasting also provides help in determining long-term goals for businesses based on identified trends. Business forecasting focuses analysis on business metrics. Business metrics provide businesses with the ability to measure performance. Key performance indicators, or KPIs, are business metrics that evaluate certain operations that a business finds indicative of successful performance. A business may use KPIs to evaluate its success, as a whole or for particular departments or projects. These assessments often lead to the identification of potential improvements, so KPIs are routinely used in process improvement. For many businesses, the amount of business metrics used and created during forecasting can be numerous. Business intelligence is a field of practice concerning the selection, determination, and presentation of KPIs and business metrics.

SUMMARY

Embodiments of the present invention provide a method, system, and program product for business forecasting. A processor receives one or more sets of business metrics, wherein at least one of the one or more sets of business metrics comprises a set of recorded events. A processor receives a first metadata descriptor for a first set of business metrics of the one or more sets of business metrics. A processor receives a second metadata descriptor for a second set of business metrics of the one or more sets of business metrics. A processor prepares the first set of business metrics for prediction of a third set of business metrics based on, at least in part, the first metadata descriptor, wherein the first set and third set each correspond to a different time period. A processor generates a fourth set of business metrics based on, at least in part, the second metadata descriptor, wherein the second set and fourth set each correspond to a different time period.

DETAILED DESCRIPTION

Figure 1:
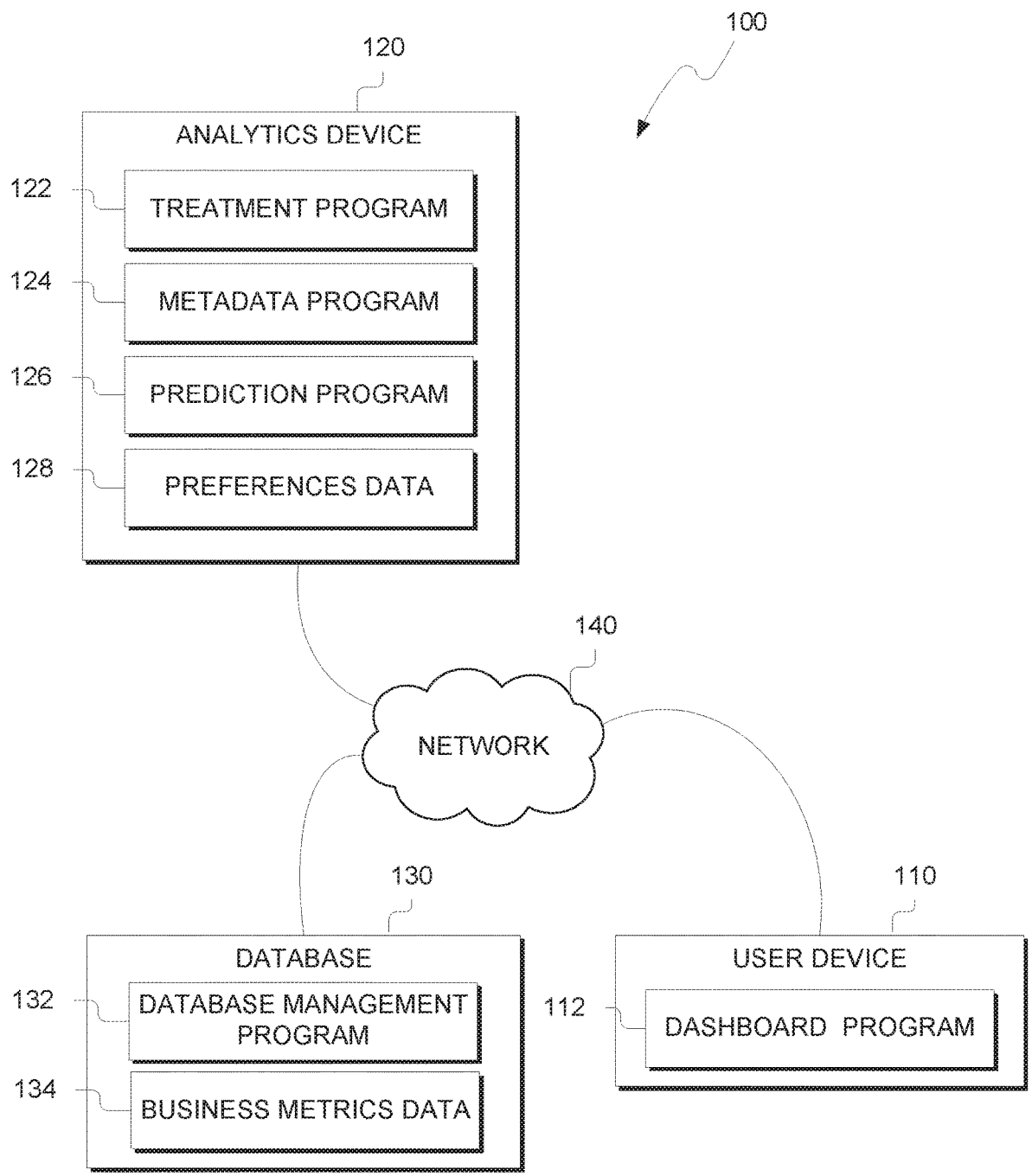
FIG. 1 is a functional block diagram illustrating a networked environment, in accordance with an exemplary embodiment of the present invention.

Embodiments of the present disclosure recognize that business forecasting solutions require manual set-up to determine how the different types of information interacts with one another. Embodiments of the present disclosure provide that, by determining the types of interactions automatically prior to forecasting, the business forecasting process can be streamlined. Also provided is that determining the types of information and how those types will behave when forecasted further aids in presentation of the information in a business intelligence dashboard.

Business forecasting techniques can be used to draw conclusions from raw data describing the operation of a business. The conclusions may be useful in making informed decisions regarding the current state of the business and use the information to plan projects. Due to the large amount of data collected, a dashboard is presented as an interface to summarize the raw data or present conclusions. A dashboard offers important information, such a key performance indicators, upon which the stakeholder bases decisions regarding the operation of the business. A dashboard may also identify trends in data and present predicted performance by way of business forecasting. Business forecasting determines trends and predicts data values of key performance indicators through statistical analysis, which may be computationally complex. A dashboard presents determined trends such that planning future projects can also take into consideration possible changes to the key performance indicators.

Business forecasting requires constant updating due to the large amounts of incoming data describing the operation of a business. As such, determining a prediction quickly becomes computationally complex and taxing on the computing systems used to generate dashboards. Embodiments of the present disclosure provide for determining descriptors (i.e., metadata) that identify a type of information for the incoming data describing the operations of a business. Based on the determined metadata, some predicted data values can be automatically determined without the need to perform constant statistical analysis each time a business forecast is requested. By preparing the requested data for forecasting, embodiments of the present disclosure reduce the amount of business information statistically analyzed each time a new business forecast is requested.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating networked environment, generally designated 100, in accordance with one embodiment of the present invention. Networked environment 100 includes user device 110, analytics device 120 and database 130 connected over network 140. User device 110 includes dashboard program 112. Analytics device 120 includes treatment program 122, metadata program 124, prediction program 126 and preferences data 128. Database 130 includes database management program 132 and business metrics data 134.

In various embodiments of the present invention, user device 110, analytics device 120 and database 130, respectively, are computing devices that can each be a standalone device, a server, a laptop computer, a tablet computer, a netbook computer, a personal computer (PC), or a desktop computer. In another embodiment, user device 110, analytics device 120 and database 130 each respectively represent a computing system utilizing clustered computers and components to act as a single pool of seamless resources. In general, analytics device 120 can be any computing device or a combination of devices with access to user device 110 and database 130 and is capable of executing dashboard program 112, treatment program 122, metadata program 124, prediction program 126 and database management program 132. User device 110, analytics device 120 and database 130 may each respectively include internal and external hardware components, as depicted and described in further detail with respect to FIG. 5.

In this exemplary embodiment, dashboard program 112 is stored on user device 110. However, in other embodiments, dashboard program 112 may be stored externally and accessed through a communication network, such as network 140. In this exemplary embodiment, treatment program 122, metadata program 124, prediction program 126 and preferences data 128 are stored on analytics device 120. However, in other embodiments, treatment program 122, metadata program 124, prediction program 126 and preferences data 128 may be stored externally and accessed through a communication network, such as network 140. In this exemplary embodiment, database management program 132 and business metrics data 134 are stored on database 130. However, in other embodiments, business metrics data 134 may be stored externally and accessed through a communication network, such as network 140. Network 140 can be, for example, a local area network (LAN), a wide area network (WAN) such as the Internet, or a combination of the two, and may include wired, wireless, fiber optic or any other connection known in the art. In general, network 140 can be any combination of connections and protocols that will support communications between user device 110, analytics device 120 and database 130, in accordance with a desired embodiment of the present invention.

In exemplary embodiments, dashboard program 112 of user device 110 provides an interface which presents graphical representations of key performance indicators (KPIs), in the form of one or more reports to a user. Dashboard program 112 sends a request for business metrics to database management program 132 of database 130 based on the KPIs and business metrics displayed in a report. A business metric is one or more data values that describe the operation of a business according to a particular method of measurement to which the business metric corresponds. A KPI is a business metric that reflects or represents progress of a business or organization toward a goal. A business metric may describe the operation of a business on a continuous, transactional, batch, or other basis. A business metric may correspond to methods of measurements related to, for example, sales revenue, profit, fixed costs, variable costs or inventory. Business metrics may also include specific information regarding a transaction that a business has undertaken, such as information describing a party in the transaction, e.g., an age of a consumer, a location of a purchase or a department of the business the transaction is attributed to. A KPI may be presented by a report of dashboard program 112 in relation to one or more other business metrics. For example, a user of dashboard program 112 may request a report that presents a KPI as a function of one or more other business metrics. KPIs and their relation to other business metrics can be used to determine trends for the operation of the business. The reports can enable a user of dashboard program 112 to generate strategic plans.

In exemplary embodiments, database management program 132 retrieves business metrics from business metrics data 134 of database 130. Database management program 132 sends the business metrics to dashboard program 112. Dashboard program 112 receives the business metrics and updates the reports based on the received business metrics. In some embodiments, dashboard program 112 automatically updates the business metrics used to present the reports. For example, the reports may be updated at intervals measured in, for example, seconds, hours, days, months, quarters, years, or other units of time. In some embodiments, database management program 132 determines that a change has occurred to business metrics stored in business metrics data 134. In response, database management program 132 sends the relevant business metrics to dashboard program 112. For example, database management program 132 may receive a request to change or add business metrics to business metric data 134 and, in response, database management program 132 sends the updated business metrics to dashboard program 112. Alternatively, database management program 132 may monitor business metrics data 134 for changes. In response to determining that a change has occurred, database management program 132 may send updated business metrics to dashboard program 112. In other embodiments, dashboard program 112 receives a user interaction indicating a request to update one or more reports of a dashboard. Dashboard program 112 queries one or both of database management program 132 based on the request in order to retrieve the business metrics from business metrics data 134.

In exemplary embodiments, dashboard program 112 presents one or more reports via user device 110. Which reports are presented is based on a configuration stored in preferences data 128 of analytics device 120. Dashboard program 112 can update preferences data 128 (e.g., based on user input) in order to add, change or remove reports to be presented by dashboard program 112. For example, a user can select any number of business metrics and KPIs to be presented in a report when adding reports to dashboard program 112. Also, a user may add additional KPIs or business metrics to an existing report. A user of user device 110 may configure one or more reports, each of which displays one or more KPIs and the relation of each displayed KPI to one or more business metrics. Configurations of a report are stored in preferences data 128. Configurations may include the KPIs and business metrics included in a report, a range of values to present as dimensions in a report, a time interval, a time period (e.g., the beginning and end points in time for which a report is presented), a report type (e.g., bar graph, line graph, table) and any rules in handling the KPIs and business metrics presented in a report. For example, dashboard program 112 retrieves a configuration for a report from preferences data 128. The configuration includes a KPI corresponding to sales, with a time interval for calendar months and a time period of the trailing twelve months. The configuration also indicates including in the report the business metric corresponding to the department that realized the sales. Furthermore, the configuration also indicates that the report should be presented as a bar graph. Dashboard program 112 sends a request to database management program 132 for sales for each department over the last twelve months. Dashboard program 112 presents a report comprising a bar graph. Twelve sets of bars are presented, one for each of the trailing twelve months. Each set of bars for a corresponding month comprises a bar for the sales that a particular department generated for that month.

In some embodiments, the one or more reports may also be grouped such that changes to preferences data 128 applied to the group are applied to each report that is a member of the group. Both the KPIs and business metrics to be presented in a report and any groupings of reports are stored as preferences data 128. A report may present business metrics and KPIs over one or more intervals of time (for example, one or more daily, weekly, monthly or yearly intervals). The interval of time over which a report presents a business metric or KPI may be determined based on an interval of time associated with the presented business metric or KPI. Alternatively, the interval of time may be determined by, in various examples, user input, configurations (e.g., as stored in preferences data 128), or a predetermined template.

In exemplary embodiments, dashboard program 112 provides an interface element to toggle the display of a predicted view between an enabled and a disabled state. The predicted view is a view that displays predicted values of KPIs and business metrics alongside recorded values of KPIs and business metrics. Recorded values of KPIs and business metrics may be stored in business metrics data 134. The interface element may enable or disable the view for one or more of the reports presented by dashboard program 112. Based on user input indicating to enable the predicted view for a report, dashboard program 112 sends a request to update the report with information regarding predicted values for the KPIs and business metrics currently represented by the report to treatment program 122. In some embodiments, dashboard program 112 presents an interface element that can receive user input indicating a length of time beyond the time period currently represented by the report that the predicted view will present when it is enabled. For example, the user may indicate certain duration (e.g., three months or two quarters).

In exemplary embodiments, treatment program 122 identifies, based on preferences data 128, the KPIs and business metrics presented by a report in response to receiving a request to generate a predicted view for the report. Treatment program 122 analyzes preferences data 128 to determine the current configuration of a report as displayed by dashboard program 112 as well as any applicable rules related to the KPIs and business metrics displayed within the report. For example, a current configuration may identify the type of graphical representation currently displayed by a report, e.g., a line graph of weekly sales for the current fiscal year. As another example, an applicable rule for a report may describe the order in which the business metrics are mapped to the dimensions of a graph, e.g., the primary and secondary axes. Upon determination of the KPIs and business metrics presented in the report, the configuration stored in preferences data 128 for a report, and any applicable rules, treatment program 122 requests metadata describing the KPIs and business metrics from metadata program 124.

In exemplary embodiments, metadata program 124 generates descriptors representing how the business metrics are to be prepared when generating a predicted view of a report. Metadata program 124 applies statistical models and techniques to determine trends and relationships among each business metric stored in business metric data 134. Such statistical models and techniques may include, for example, regression analysis, least squares, moving average, curve fitting, hypothesis testing, data mining, pattern recognition, time series models, econometric models, autoregressive integrated moving average, single exponential smoothing, derivative models, univariate models, multivariate models or other models and techniques. The statistical models may also include seasonality treatment. Metadata program 124 generates descriptors for business metrics stored in business metrics data 134. Descriptors for business metrics may include descriptive properties of a particular business metric and a behavior or trend of the business metric. In some embodiments, database management program 132 sends a notification to metadata program 124 of any changes. Changes to business metric data 134 may include new types of business metrics added, business metrics being removed, or changes in values of business metrics. In response to receiving the notification, metadata program 124 generates the descriptors for the business metrics stored in business metrics data 134. In other embodiments, metadata program 124 generates the descriptors in response to treatment program 122 receiving a request to generate a predicted view from dashboard program 112. For example, dashboard program 112 receives user input to generate a predicted view for a report. Dashboard program 112 sends a request to treatment program 122 to prepare a set of predicted business metrics to present. Treatment program 122 sends a request to metadata program 124 to generate descriptors.

In exemplary embodiments, metadata program 124 generates metadata descriptors of properties describing business metrics stored in business metrics data 134. One property of that a metadata descriptor may describe is whether a business metric stored in business metrics data 134 is an independent metric of the business metrics. An independent metric is a data variable stored in business metrics data 134 that uniquely identifies other business metrics. The independent metric may be temporal, e.g., timestamp or month a specific business metrics was recorded or occurred. Independent metrics may be nominal, e.g., a customer name/identifier or a department. Independent metrics may also be spatial (e.g., a storefront location, a manufacturing plant location, a territory, a country or region). Independent metrics may vary independently of the other information stored in business metrics data 134. Another property of metadata descriptors is if a particular piece of business metrics is a dependent metric. Business metrics with dependent metric metadata descriptors depend on or are influenced by other information stored in business metrics data 134. Dependent metrics may depend on business metrics determined to be independent metrics or other business metrics that are also dependent metrics.

In exemplary embodiments, metadata program 124 classifies independent metrics into one of two types of metadata, longitudinal independent metrics and non-longitudinal independent metrics. Longitudinal independent metrics are independent data fields that can be projected along an axis. For example, a business metric representing the month that a transaction occurs may be a longitudinal independent metric since it can be projected along an axis of time. A non-longitudinal independent metric cannot be projected along an axis but is still unique, and therefore independent, to the other fields of the transaction. For example, a data field representing a department may be a non-longitudinal independent metric since it is unique to the transaction, however it cannot be projected since the departments of a business are limited to an enumerated group and will therefore need to be directly copied for a prediction of predicted values.

In exemplary embodiments, metadata program 124 generates additional metadata descriptors for dependent metrics. Dependent metrics may include two additional types of metadata descriptors: known series and unknown series. Known series are business metrics that have predetermined trends or relationships with business metrics with the independent metrics metadata descriptor and other business metrics with the known series metadata descriptor. For example, a known series may be a fixed cost related to a transaction. The fixed cost will not vary for each transaction. The values of other dependent metrics, such as total number of sales, will not affect the known series value. An unknown series is one that has a non-predetermined trend or relationship and requires forecasting or other predictive techniques to generate a predicted set of values. For example, an unknown series may be sales of a product for the next three months of a quarter.

In exemplary embodiments, metadata program 124 generates additional metadata descriptors for known series. The additional metadata descriptors include recorded series and expression series. Recorded series are dependent metrics that comprise pre-existing values stored in business metrics data 134, such as sales figures from a time period in the past. Expression series are dependent metrics that can be determined by using an equation or other known relationships between other dependent metrics and independent metrics. For example, an expression series may be last year's monthly profit where the expression series metadata descriptor would associate a mathematical expression of other dependent metrics and independent metrics to calculate the expression series. The expression for last year's monthly profit would be as follows, last year's revenue for a month would be the total cost (recorded series) for a month (longitudinal independent metric) subtracted from the total revenue (recorded series) for a month (longitudinal independent metric). In exemplary embodiments, metadata program 124 stores the determined metadata descriptor, as well as any expressions determined for expression series, in preferences data 128 for each type of business metrics stored in business metric data 134. In other embodiments, the determined metadata descriptor for each type of business metrics is stored in business metric data 134.

In some embodiments, a user may manually assign metadata descriptors for business metrics. An interface is presented to a user of dashboard program 112 to assign a metadata descriptor for a business metric. For example, a user may assign a metadata descriptor when adding business metrics to business metrics data 134. As another example, a user may change a metadata descriptor determined by metadata program 124 for a business metric. A user's assignment of metadata descriptor may be stored in preferences data 128 or as part of business metric data 134.

In exemplary embodiments, treatment program 122 prepares a predicted set of business metrics to be forecasted by prediction program 126. Based on the period of time to be forecasted, treatment program 122 projects the recorded business metrics determined to be independent metrics into the predicted set of business metrics. For example, treatment program 122 creates a new set of predicted business metrics for longitudinal independent metrics based on the length of the period for the requested forecast, incrementing the longitudinal independent metric for each entry in the set of predicted business metrics. As another example, non-longitudinal independent metrics are copied to the set of predicted business metrics in the order for which they appear in the recorded business metrics. Treatment program 122 imports known series into the set of predicted business metrics. Regarding recorded known series, treatment program 122 retrieves the recorded business metrics time shifted by the period of forecasting. For example, if the business metric data 134 was the previous year's monthly sales and the forecasting period is twelve months, then treatment program 122 imports the monthly sales of the current year to the predicted business metrics. Treatment program 122 calculates expression series based on the projected independent metrics and imported recorded series comprising the predicted business metrics. A more detailed description of how treatment program 122 uses metadata determine predicted business metrics is found below in FIG. 3. In some embodiments, treatment program 122 also formats the data such that prediction program 126 can interpret the information without additional conversion. For example, if the business metric data is formatted in Extensible Markup Language, or XML, however prediction program 126 is programmed to process Predictive Model Markup Language, or PMML, then treatment program 122 will convert the business metrics prior to sending to prediction program 126.

In exemplary embodiments, treatment program 122 sends the prepared set of predicted business metrics to prediction program 126. Prediction program 126 determines trends for business metrics and forecasts business metrics with the unknown series metadata descriptor. Prediction program 126 may forecast business metrics using prediction methods such as linear regression, moving averages, data mining or pattern recognition. In other embodiments, various other prediction methods of determining a trend in a business metrics or a relationship to predict one or more business metrics may be used. Prediction program 126 generates the values in the predicted business metrics for the unknown series. Prediction program 126 returns the predicted business metrics to treatment program 122. Treatment program 122 sends the set of predicted business metrics to dashboard program 112. Dashboard program 112 presents a predicted view using the set of predicted business metrics related to the report for which the predicted view was enabled for. A more detailed description of how dashboard program 112 presents predicted business metrics for the one or more reports for a predicted view is found below in FIG. 4.

Figure 2:
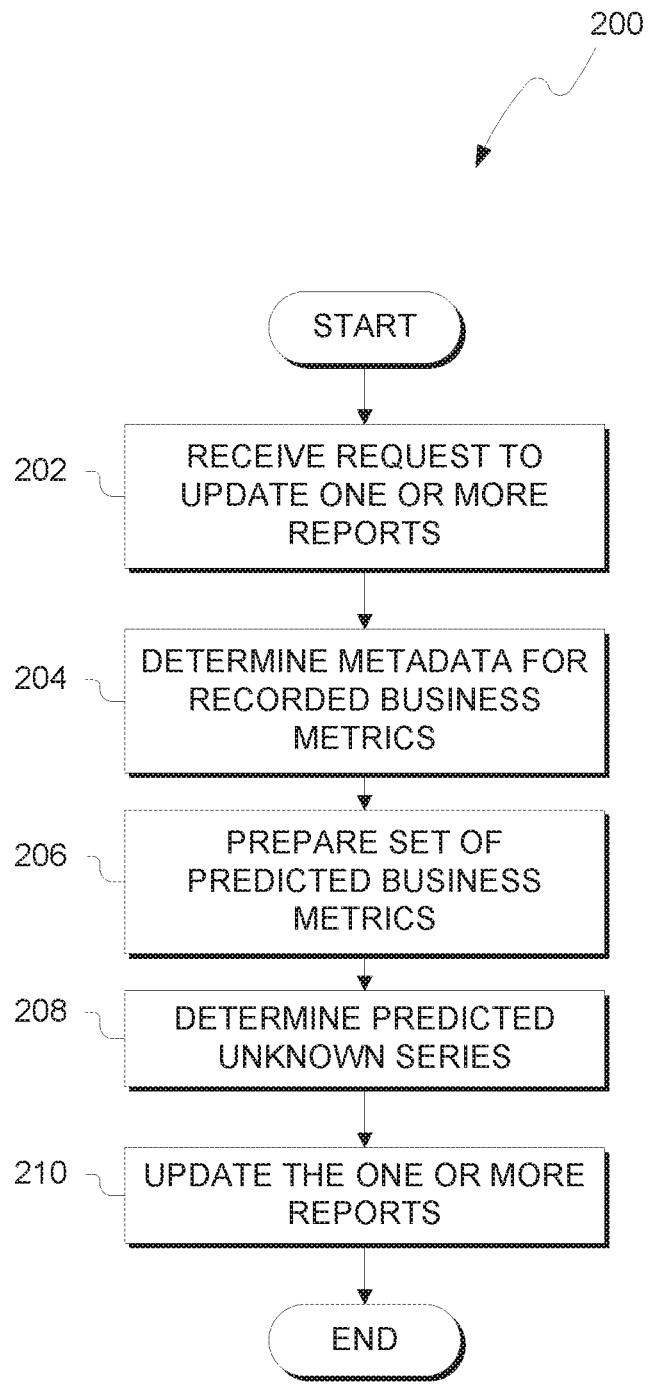
FIG. 2 illustrates operational processes of a program for business forecasting using predictive metadata, on a computing device within the environment of FIG. 1, in accordance with an exemplary embodiment of the present invention.

FIG. 2, is a flowchart illustrating operational processes, generally designated 200, of treatment program 122, metadata program 124 and prediction program 126, all executing on analytics device 120, in accordance with an embodiment.

In process 202, treatment program 122 receives a request to update one or more reports of dashboard program 112. Treatment program 122 retrieves the respective configurations from preferences data 128 for the one or more reports. The request may also include a period of time for a predicted view to be presented. In one embodiment, the update request includes a request to update the one or more reports with a predicted view of the business metrics presented in the one or more reports. In other embodiments, a request may be for a group of reports. In such embodiments, treatment program 122 retrieves the respective configurations from preferences data 128 for each of the reports represented by the group.

In process 204, metadata program 124 determines metadata descriptors for the recorded business metrics. Metadata program 124 receives the recorded business metrics from database management program 132. In exemplary embodiments, metadata program 124 determines whether a metadata descriptor has been previously determined for a specific business metric. If a metadata descriptor has already been determined, then metadata program 124 keeps the metadata descriptor. If a metadata descriptor has not been determined, then metadata program 124 determines a metadata descriptor for the business metric. Metadata program 124 stores the metadata descriptors in preferences data 128.

In process 206, treatment program 122 prepares a set of predicted business metrics. Treatment program 122 creates an initial set of predicted business metrics and generates one or more values based on the determined metadata descriptors (see process 204). Treatment program 122 generates values for predicted business metrics with determined metadata descriptors of independent metrics and dependent metrics. The preparation and generation of predicted business metrics prior to prediction of the business metrics with the unknown series metadata descriptor is discussed in more detail in FIG. 3 below.

In process 208, prediction program 126 determines the values for the predicted business metrics with determined metadata descriptors of unknown series. Prediction program 126 determines trends or relationships (e.g., by statistical analysis) for business metrics with determined metadata descriptors of unknown series. Prediction program 126 generates values for the predicted business metrics with determined metadata descriptors unknown series. Prediction program 126 sends the generated values for the predicted business metrics to treatment program 122.

In process 210, treatment program 122 updates the one or more reports with the predicted business metrics. Treatment program 122 sends the updated reports to dashboard program 112. A more detailed description of how dashboard program 112 presents predicted business metrics for the one or more reports for a predicted view is found below in FIG. 4.

Figure 3:
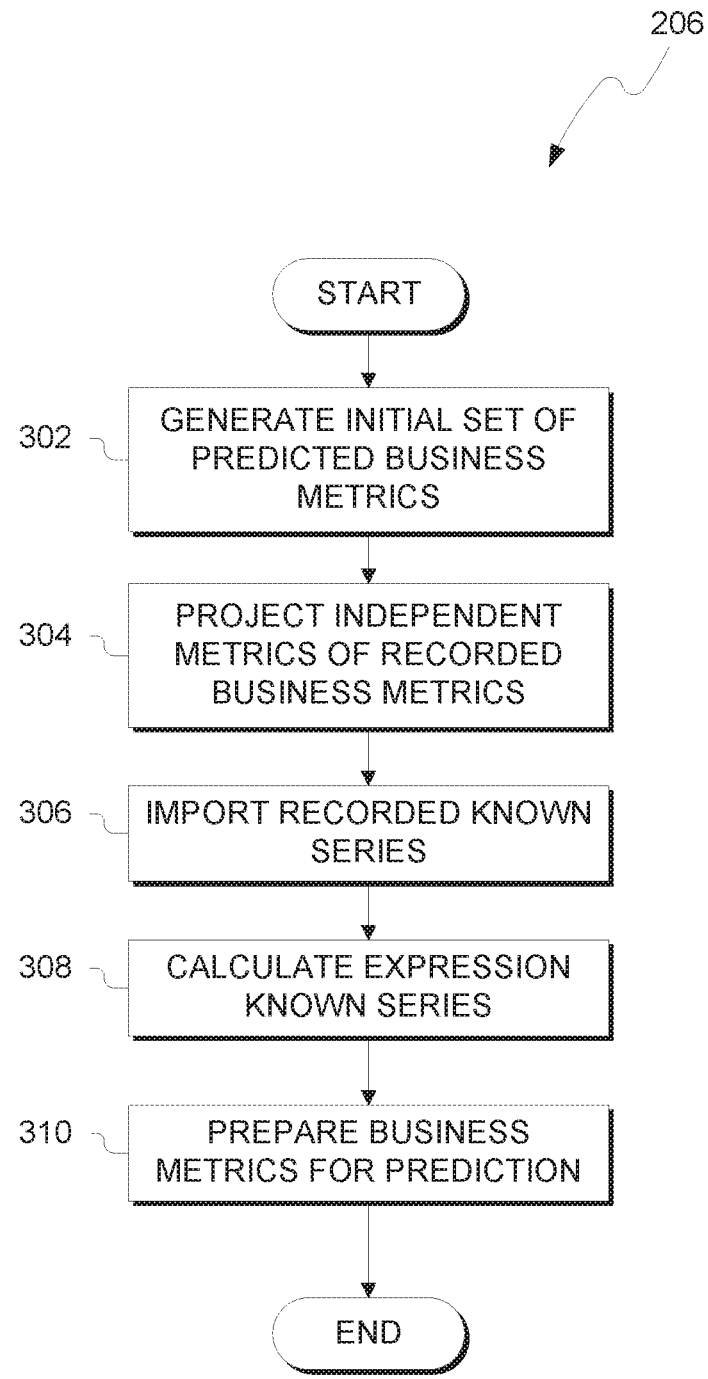
FIG. 3 illustrates operational processes of a treatment program for preparing business metrics based on determined metadata, operating on a computing device within the environment of FIG. 1, in accordance with an exemplary embodiment of the present invention.

FIG. 3, is a flowchart illustrating the operational processes, generally designated 206, of treatment program 122, executing on analytics device 120, when preparing predicted business metrics to provide to prediction program 126 in accordance with an embodiment.

In process 302, treatment program 122 generates a set of predicted business metrics. In one embodiment, treatment program 122 generates the set of predicted business metrics based on the business metrics reflected by the one or more reports and the number of intervals the requested predicted view indicated. For example, a report for which a predicted view is requested presents monthly sales for the trailing twelve months. Treatment program 122 creates a set of predicted business metrics including predicted sales and the months that the prediction will be made. Treatment program 122 will a set of a certain size based on the interval or period of time for which the prediction will be determined. In some embodiments, a user specifies (e.g., via dashboard program 112) the interval for the prediction. In other embodiments, a default or preferred interval for the prediction is retrieved from preferences data 128. For example, if a user requests a predicted view for a report to display three months of predicted business metrics, then treatment program 122 will create a set of predicted business metrics that includes three records of the information.

In process 304, treatment program 122 will project the business metrics indicated to be independent metrics. Treatment program 122 determines a degree of increment for independent metrics. Based on the degree of increment, treatment program 122 increments the business metric for each interval of the requested prediction period. For example, treatment program 122 determines that a business metric indicates the month a transaction occurred and assigns the metadata descriptor of longitudinal independent metric (see process 206). Based on the metadata descriptor indicating a longitudinal independent metric, treatment program 122 determines the degree of increment for the business metric (i.e., one month, in this example). For the set of predicted business metrics, treatment program 122 projects the business metric representing the month a transaction occurred by one month from the last occurrence of the recorded business metric in business metric data 134. As another example, a report presents a business metric representing the age groups of customers, e.g., 18-19, 20-21, 22-23, and 24-25. Treatment program 122 assigns the business metric a metadata descriptor of non-longitudinal independent metric (see process 206). Based on the metadata descriptor indicating a non-longitudinal independent metric, treatment program 122 determines any trend(s) in the series. In this example, treatment program 122 determines that the series increases by two for each entry. For the set of predicted business metrics, treatment program 122 projects the business metric representing age by two from the last occurrence of the recorded business metric in business metric data 134.

In process 306, treatment program 122 imports business metric values for recorded known series from business metrics data 134 into the set of predicted business metrics. For business metrics determined to have recorded known series metadata descriptors, treatment program 122 retrieves a series of values of the business metric from business metric data 134 and imports the value into the set of predicted business metrics. For example, a business metric corresponding to sales figures of a previous year is determined to be a recorded known series and given the recorded metadata descriptor (see process 206). Treatment program 122 retrieves the series of data for the business metric from business metrics data 134 and imports the values for into the set of predicted business metrics. If the predicted view is to be determined to be three months in advance, then treatment program 122 retrieves the corresponding projected months for the sales figures of the previous year.

In process 308, treatment program 122 calculates business metrics with the expression metadata descriptor. In one embodiment, treatment program 122 calculates expression business metrics by determining values of a predicted business metric based on the determined expression and one or both of the independent and dependent business metrics. Treatment program 122 retrieves the determined expression from preferences data 128. Treatment program 122 determines the value for the predicted business metrics that are determined to be expression known series by using the information generated in processes 304 and 306 for the set of predicted business metrics and calculating each record using the retrieved expression. For example, a profit business metric for last year is determined to have an expression metadata descriptor. The set of predicted business metric presents entries for a month that a transaction occurred (longitudinal independent metric), last year's sales (recorded known series) and a unit cost (recorded known series). Treatment program 122 determines that the last year's profit business metric is an expression known series, with a corresponding expression for a given month of cost subtracted from last year's sales. For each month of the set of predicted business metrics, treatment program 122 calculates last year's profit based on the retrieved expression.

In process 310, treatment program 122 prepares the unknown series for forecasting by prediction program 126. For business metrics determined to have metadata descriptors indicating the business metric is a unknown series, treatment program 122 will format the particular business metric in the set of predicted business metrics to indicate to prediction program 126 that the particular business metric is to be forecasted. In some embodiments, prediction program 126 operates with a certain format. In such embodiments, if business metrics data 134 is stored in another format, the treatment program 122 will reformat the business metrics data 134 and the predicted set of business metric to match the format used by prediction program 126.

Figure 4:
FIG. 4 illustrates a user interface of a dashboard program, in accordance with an exemplary embodiment of the present invention.

FIG. 4 illustrates screenshots 400 of dashboards 402a and 402b, in accordance with an exemplary embodiment of the present invention.

Dashboard 402a illustrates an example interface for dashboard program 112. Dashboard 402a may include a description 404a of the overall report. Description 404a may also include the current time period displayed by dashboard 402a. Dashboard 402a illustrates dashboard program 112 presenting recorded business metrics stored in business metrics data 134. Dashboard 402a includes multiple reports (i.e., reports 410a, 420a and 430a). Report 410a presents a scatter plot for different customers and the respective cost per units sold for each customer. Report 420a includes sub-reports 424a and 427a. Sub-report 424a is a line chart presenting the monthly sales recorded. Sub-report 427a is a bar graph presenting year-over-year sales, which compares sales from the current period (in the depicted embodiment, January 2014 to April 2014) and the same period for the previous calendar year (in the depicted embodiment, January 2013 to April 2013). Report 430a is a pie chart presenting the percentage of profit realized for the customers C1, C2, C3 and C4.

Dashboard 402a illustrates an example interface that provides two global interface elements, global predicted view 408a and global prediction period 406a. Each report or sub-report may have a local predicted view interface element, e.g., predicted view interface elements 412a, 422a, 425a, 428a and 432a. Each report or sub-report may have a local prediction period interface elements 414a, 423a, 426a, 429a and 434a. In exemplary embodiments, global predicted view interface element 408a and global prediction period interface element 406a override the state of the local interface elements for reports, i.e., predicted view interface elements, 412a, 422a and 432a, and prediction period interface elements, 414a, 423a and 434a. The predicted view interface element 422a and prediction period interface element 423a override the state of sub-report predicted view interface elements, 425a and 428a, and sub-report prediction period interface elements, 426a and 429a, respectively. In other embodiments, an override prevention interface elements 416a and 436a are presented. Enabling override prevention interface elements 416a and 436a prevents such overrides occurring and lock the state of the predicted view and prediction period interface elements currently chosen for the report or sub-report. In exemplary embodiments, the state of each interface element is stored in preferences data 128 of analytics device 120. In other embodiments, the state of each interface element is stored locally in client device 110.

Dashboard 402b illustrates an example interface for dashboard program 112. Dashboard 402b illustrates the same interface as dashboard 402a with certain interface elements having different states enabled. In this example, global predicted view interface element 408b is enabled and global prediction period interface element 406b is set to predict two months of predicted business metrics. Based on the value presented by global prediction period interface element 406b, dashboard program 112 updates description 404b with the predicted period of time presented by dashboard 402b. In response to the global predicted view interface element 408b being enabled, dashboard program 112 sends a request to treatment program 122 to update reports 410b and 420b. Dashboard program 112 propagates the global predicted view request to any sub-reports. Dashboard program 112 sends a request to treatment program 122 to update sub-reports 424b and 427b. Dashboard program 112 includes in the requests to treatment program 122 the value of global prediction period 406b (i.e. two months).

Dashboard 402b illustrates an example interface for dashboard program 112 where override prevention interface element 436b for report 430b is enabled. In response to override prevention interface element 436b being enabled, dashboard program 112 does not override the local predicted view interface element 432b. Conversely, override prevention interface element 416b for report 410b is not enabled, and, as such, dashboard program 112 overrides the local predicted view interface 412b. In response to the global predicted view interface element 408b being enabled and override prevention interface element 416b not being enable, dashboard program 112 sends a request to update the report to treatment program 122 even though local predicted view interface element 412b is not enabled. Similarly local prediction period interface element 414b for report 410b is set for one month; however global prediction period interface element 406b overrides the setting and sends a request to treatment program 122 to update report 410b with a predicted view of two months, which is the value of global prediction period interface element 406b. Local prediction period interface elements 422b and 425b are enabled and local prediction period interface element 428b is not enabled. Report 420b and sub-reports 424b and 427b do not present an override prevention interface element, therefore global predicted view interface element 408b overrides the state of local prediction period interface elements 422b, 425b and 428b. Global prediction period interface element 406b overrides local prediction period interface elements 423b, 426b and 429b, based on report 420b and sub-reports 424b and 427b not presenting an override prevention interface element. Dashboard program 112 receives updated reports from treatment program 122 based on the requests. Dashboard program 112 updates report 410b and sub-reports 424b and 427b. Updated report 410b and sub-reports 424b and 427b present a predicted view of two months for the business metrics previously presented in respective report 410a and sub-reports 424a and 427a of dashboard 402a.

Figure 5:
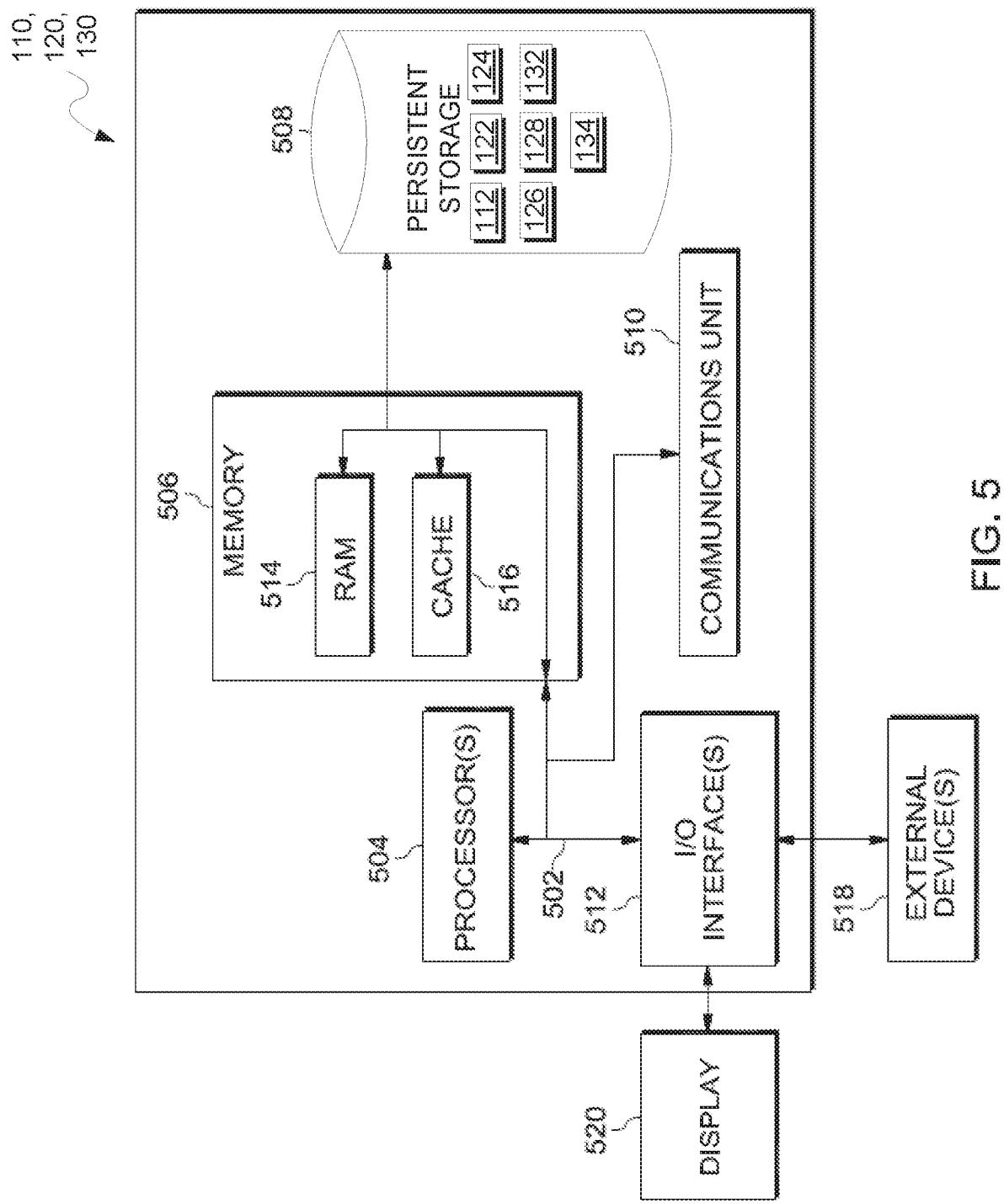
FIG. 5 depicts a block diagram of components of a computing device executing a dashboard program, a metadata program, a treatment program, a prediction program and a database management program, in accordance with an exemplary embodiment of the present invention.

FIG. 5 depicts a block diagram of components of user device 110, analytics device 120 and database 130, respectively, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

User device 110, analytics device 120 and database 130, respectively, include communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Dashboard program 112, treatment program 122, metadata program 124, prediction program 126, preferences data 128, database management program 132 and business metrics data 134 are, respectively, stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 140. In these examples, communications unit 510 includes one or more network interface cards. Communications unit 510 may provide communications through the use of either or both physical and wireless communications links. Dashboard program 112, treatment program 122, metadata program 124, prediction program 126, preferences data 128, database management program 132 and business metrics data 134 may, respectively, be downloaded to persistent storage 508 through communications unit 510.

I/O interface(s) 512 allows for input and output of data with other devices that may be connected to computing devices user device 110, analytics device 120 and database 130, respectively. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., dashboard program 112, treatment program 122, metadata program 124, prediction program 126, preferences data 128, database management program 132 and business metrics data 134, can, respectively, be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for comprising:
    receiving, by one or more processors, one or more sets of data for projection;
    identifying, by the one or more processors, a first metadata value associated with a first set of the one or more sets of data, wherein the first metadata descriptor indicates that the first set is associated with a non-predetermined trend;
    identifying, by the one or more processors, a second metadata value is associated with a second set of the one or more sets of data, wherein (i) the second metadata descriptor indicates that the second set is associated with a predetermined trend, and (ii) the second metadata value includes an expression indicating the predetermined trend;
    in response to the first metadata descriptor indicating that the first set is associated with the non-predetermined trend, determining, by the one or more processors, one or more projected values of the first set of data based, at least in part, on one or more statistical models;
    in response to the second metadata descriptor indicating that the second set is associated with the predetermined trend, generating, by the one or more processors, one or more projected values of the second set of data based, at least in part, on the expression indicating the predetermined trend;
    displaying, by the one or more processors, the one or more projected values of the first and second sets of data;
    displaying, by the one or more processors, an override protection interface element associated with the first set of data; and
    in response to the override protection interface element being enabled during the display of the one or more projected values of the first set of data, updating, by the one or more processors, the display of the one or more projected values of the first set of data based on at least one local setting associated with the first set of data, wherein the updated projection of the first set of data overrides at least one global setting of a dashboard interface with the at least one local setting.

2. The method of claim 1, wherein the one or more projected values of the first and second set of data are displayed on the dashboard interface.

3. The method of claim 2, the method further comprising:
    identifying, by the one or more processors, at least one trend based, at least in part, on the displayed one or more projected values of the first and second set of data on the dashboard interface.

4. The method of claim 2, wherein the dashboard interface includes at least one graphical representation of the one or more projected values of the first and second set of data.

5. The method of claim 2, the method further comprising:
    retrieving, by the one or more processors, a configuration for the dashboard interface; and
    displaying, by the one or more processors, the dashboard interface based, at least in part, on the retrieved configuration.

6. The method of claim 1, wherein the expression indicating the predetermined trend includes a relationship between the second set of data and at least one other set of data of the one or more sets of data.

7. A computer program product comprising:
one or more computer-readable storage media and program instructions stored on the one or more computer-readable storage media, the program instructions comprising:
program instructions to receive one or more sets of data for projection;
program instructions to identify a first metadata value associated with a first set of the one or more sets of data, wherein the first metadata descriptor indicates that the first set is associated with a non-predetermined trend;
program instructions to identify a second metadata value is associated with a second set of the one or more sets of data, wherein (i) the second metadata descriptor indicates that the second set is associated with a predetermined trend, and (ii) the second metadata value includes an expression indicating the predetermined trend;
in response to the first metadata descriptor indicating that the first set is associated with the non-predetermined trend, program instructions to determine one or more projected values of the first set of data based, at least in part, on one or more statistical models;
in response to the second metadata descriptor indicating that the second set is associated with the predetermined trend, program instructions to generate one or more projected values of the second set of data based, at least in part, on the expression indicating the predetermined trend;
program instructions to display the one or more projected values of the first and second set of data;
program instructions to display an override protection interface element associated with the first set of data; and
in response to the override protection interface element being enabled during the display of the one or more projected values of the first set of data, program instructions to update the display of the one or more projected values of the first set of data based on at least one local setting associated with the first set of data, wherein the updated projection of the first set of data overrides at least one global setting of a dashboard interface with the at least one local setting.

8. The computer program product of claim 7, wherein the one or more projected values of the first and second set of data are displayed on the dashboard interface.

9. The computer program product of claim 8, the program instructions further comprising:
program instructions to identify at least one trend based, at least in part, on the displayed one or more projected values of the first and second set of data on the dashboard interface.

10. The computer program product of claim 8, wherein the dashboard interface includes at least one graphical representation of the one or more projected values of the first and second set of data.

11. The computer program product of claim 8, the program instructions further comprising:
program instructions to retrieve a configuration for the dashboard interface; and
program instructions to display the dashboard interface based, at least in part, on the retrieved configuration.

12. The computer program product of claim 7, wherein the expression indicating the predetermined trend includes a relationship between the second set of data and at least one other set of data of the one or more sets of data.

13. A computer system comprising:
one or more computer processors;
one or more computer readable storage media;
program instructions stored on the computer readable storage media for execution by at least one of the one or more processors, the program instructions comprising:
program instructions to receive one or more sets of data for projection;
program instructions to identify a first metadata value associated with a first set of the one or more sets of data, wherein the first metadata descriptor indicates that the first set is associated with a non-predetermined trend;
program instructions to identify a second metadata value is associated with a second set of the one or more sets of data, wherein (i) the second metadata descriptor indicates that the second set is associated with a predetermined trend, and (ii) the second metadata value includes an expression indicating the predetermined trend;
in response to the first metadata descriptor indicating that the first set is associated with the non-predetermined trend, program instructions to determine one or more projected values of the first set of data based, at least in part, on one or more statistical models;
in response to the second metadata descriptor indicating that the second set is associated with the predetermined trend, program instructions to generate one or more projected values of the second set of data based, at least in part, on the expression indicating the predetermined trend;
program instructions to display the one or more projected values of the first and second set of data;
program instructions to display an override protection interface element associated with the first set of data; and
in response to the override protection interface element being enabled during the display of the one or more projected values of the first set of data, program instructions to update the display of the one or more projected values of the first set of data based on at least one local setting associated with the first set of data, wherein the updated projection of the first set of data overrides at least one global setting of a dashboard interface with the at least one local setting.

14. The computer system of claim 13, wherein the one or more projected values of the first and second set of data are displayed on the dashboard interface.

15. The computer system of claim 14, the program instructions further comprising:
program instructions to identify at least one trend based, at least in part, on the displayed one or more projected values of the first and second set of data on the dashboard interface.

16. The computer system of claim 14, wherein the dashboard interface includes at least one graphical representation of the one or more projected values of the first and second set of data.

17. The computer system of claim 14, the program instructions further comprising:
program instructions to retrieve a configuration for the dashboard interface; and
program instructions to display the dashboard interface based, at least in part, on the retrieved configuration.

* * * * *